(12) United States Patent
Simonich et al.

(10) Patent No.: US 6,199,123 B1
(45) Date of Patent: Mar. 6, 2001

(54) COMPUTER SYSTEM FOR SUPPORTING INCREASED PCI MASTER DEVICES WITHOUT THE REQUIRING ADDITIONAL BRIDGE CHIPS

(75) Inventors: Christopher E. Simonich, Hillsboro, OR (US); Robin T. Tran, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/126,110

(22) Filed: Jul. 30, 1998

(51) Int. Cl.$^7$ ...................................................... G06F 13/14
(52) U.S. Cl. ............................ 710/36; 710/107; 710/113; 710/40; 370/465
(58) Field of Search .................................... 710/107, 110, 710/113, 36, 38, 40; 700/231, 240; 370/395, 465, 468

(56) References Cited

U.S. PATENT DOCUMENTS

| | | | |
|---|---|---|---|
| 4,596,390 | * 6/1986 | Studley | 273/148 B |
| 5,796,961 | * 8/1998 | O'Brien | 395/287 |
| 5,940,403 | * 8/1999 | Williams | 370/465 |
| 5,956,493 | * 9/1999 | Hewitt et al. | 395/293 |
| 5,959,869 | * 9/1999 | Miller et al. | 364/479.01 |
| 5,999,533 | * 12/1999 | Peres et al. | 370/395 |

OTHER PUBLICATIONS

Intel, Bridge Products –21554 Embedded PCI–to–PCI Bridge, Aug. 19, 1999, pp. 1–3.
Intel, 21050 PCI–to–PCI Bridges, Oct. 1998, pp. 1–5.

* cited by examiner

Primary Examiner—Thomas C. Lee
Assistant Examiner—Thuan Du
(74) Attorney, Agent, or Firm—Akin, Gump, Strauss, Hauer & Feld, LLP

(57) ABSTRACT

A PCI-based computer system is provided with an expanded number of PCI master devices, in effect a second level of PCI arbitration. The expansion is made available without requiring additional bridge chips. Multiple PCI devices may arbitrate for control of the PCI bus via the primary PCI bus controller without requiring a specifically assigned signal pair, yet appear to system software to reside on the primary PCI bus.

25 Claims, 5 Drawing Sheets

COMPUTER SYSTEM FOR SUPPORTING INCREASED PCI MASTER DEVICES WITHOUT THE REQUIRING ADDITIONAL BRIDGE CHIPS

BACKGROUND OF THE INVENTION

1. Field of the Invention

The present invention relates to microprocessor based computer systems having a peripheral component interconnect, or PCL bus.

2. Description of the Related Art

Computer system complexity in microprocessor based computers has been increasing at a very rapid rate. As computer system complexity has increased, more and more processing power has been placed in peripheral devices. The purpose of this has been to transfer some of the computational workload from the microprocessor central processing unit (or CPU) to the peripheral devices.

The computational workload has been increasingly transferred to what are known as masters. In a commercial desktop personal computer system, example master devices would typically include network controllers, disk controllers (such as SCSI devices) and video controllers. The peripheral component interconnect (or PCI) bus has allowed a certain number of peripheral devices to connect to the central processing unit. Each PCI master device has required its own assigned signal pair (REQ# and GNT#) to arbitrate for the PCI bus. Existing PCI chipsets have provided a fixed number of such signal pairs, usually ten. This has in effect limited the number of PCI masters in the computer system.

The number of masters could be increased via a bridge chip, called either a PCI-to-PCI or P2P bridge chip. P2P bridge chips have in effect added a second PCI bus for a computer system, commonly known as a secondary PCI bus. The P2P bridge chip functions as a master or primary PCI bus, controlled by the core logic chipset while acting as a controller for the secondary PCI bus. Each P2P bridge permitted an additional nine master devices on a secondary PCI bus.

However, all master devices communicating with the computer system through a P2P chip have suffered in performance, usually in terms of bus access time or latency. P2P bridges have also increased system cost. Further, when there were only a few additional or extra master devices required, the additional expense of the bridge chip has caused cost concerns.

SUMMARY OF THE INVENTION

Briefly, the present invention provides a new and improved computer system which has a processor and a main memory. The computer system also includes a bus and a plurality of peripheral devices. In the preferred embodiment, the bus is a peripheral component interconnect or (PCI) bus and the peripheral devices are PCI master devices. A bridge selectively connects the bus to the processor main memory and a signal pair connects a peripheral device to the bridge. A logic circuit is provided to connect two of the peripheral devices to a single signal pair. The logic circuit performs local arbitration of requests from the peripheral devices for access to the signal pair. In this manner, the number of peripheral devices is not limited to the number of signal pairs available. More peripheral devices are afforded access through the bridge. Multiple PCI devices thus may arbitrate for control of the PCI bus while still appearing to software to be resident on the primary PCI bus. This is further accomplished without the need for a PCI-to-PCI bridge chip.

DETAILED DESCRIPTION OF INVENTION

Figure 1:
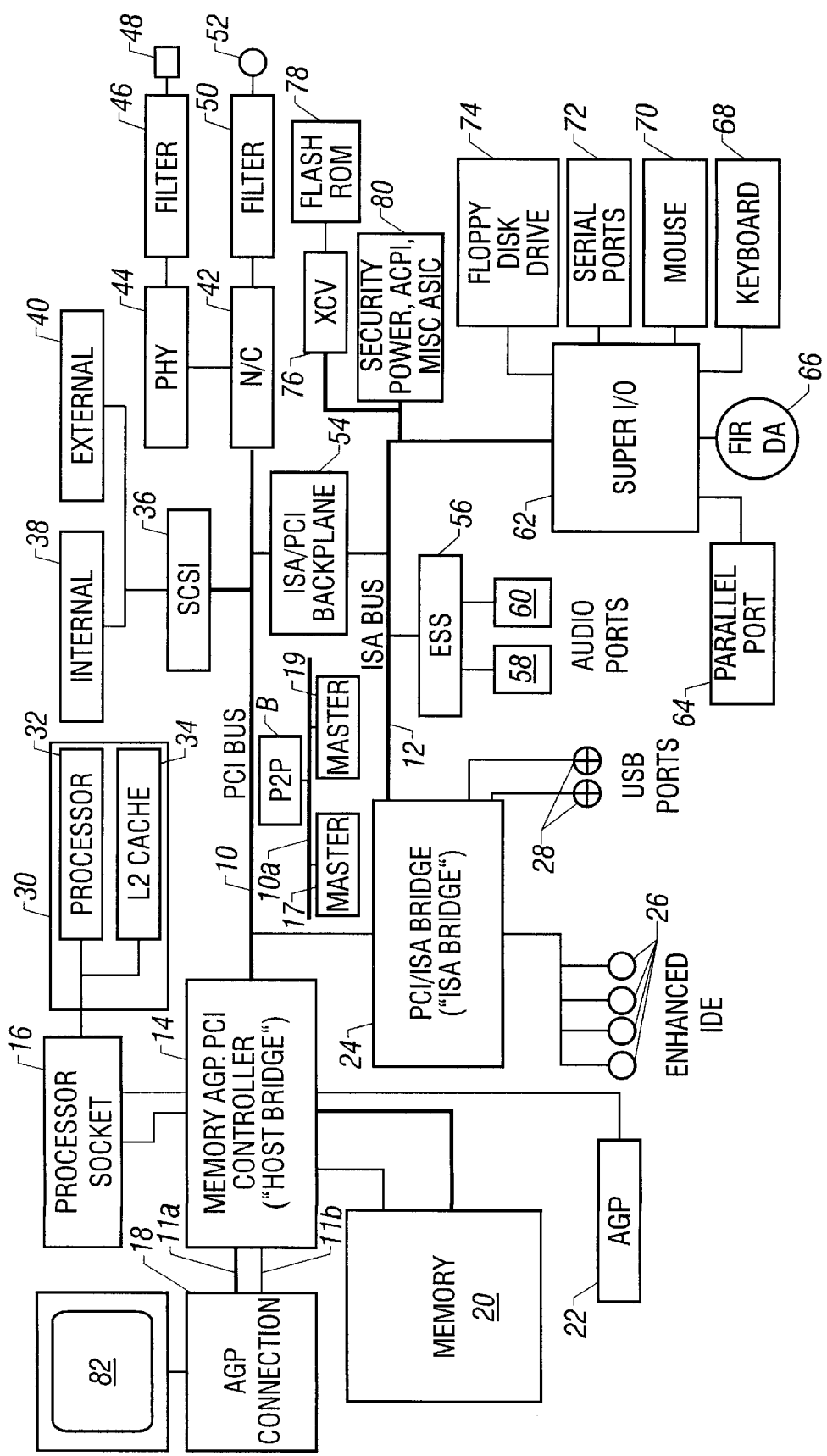
FIG. 1 is a schematic diagram of a computer system according to the prior art.

Turning to FIG. 1, illustrated is a typical prior art computer system. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 is, for example, a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte couple metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit (I2C) protocol.

The PCI bus 10 couples a variety of master devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLanTN power management specification by Texas Instruments. The NIC 42 is coupled through a physical layer 44 and a filter 46 to an RJ-45 jack 48, and through a filter 50 to a AUI jack 52.

The PCI bus 10 in the prior art has allowed a certain number of peripherals or PCI master devices of the types enumerated above to connect to the processor module 30. Each such PCI master device has required its own assigned signal pair, (REQ# 11a and GNT# 11b), as indicated schematically for example for AGP connector 18 to arbitrate for the PCI bus 10.

So far as is known, existing PCI chipsets such as bridge 14 have provided for a fixed number of REQ# and GNT# signal pairs. In the event that it became required to increase the number of PCI masters beyond this fixed number, a bridge chip B has been connected to the PCI bus 10 in place of one of the PCI master devices.

The bridge chip B has typically been referred to as a PCI-to-PCI or P2P bridge chip, such a bridge chip permitted a second PCI bus 10a to be included in the prior art computer system. Although the bridge chip B has permitted additional PCI master devices such as shown at 17 and 19 in the prior art computer systems, this has been done at an increase in both system cost and reduction in system performances, as previously noted.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and on. audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement. The flash ROM 78 includes an ESCD sector for storing ESCD and associated variables. Details concerning ESCD may be obtained from the Extended System Configuration Data Specification, Version 1.02, published on Feb. 14, 1994 by Compaq Computer Corporation, Intel Corporation, and Phoenix Technologies, Ltd.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. Finally, a video display 82 can be coupled to the AGP connector 18 for display of data by the computer system S.

Figure 2:
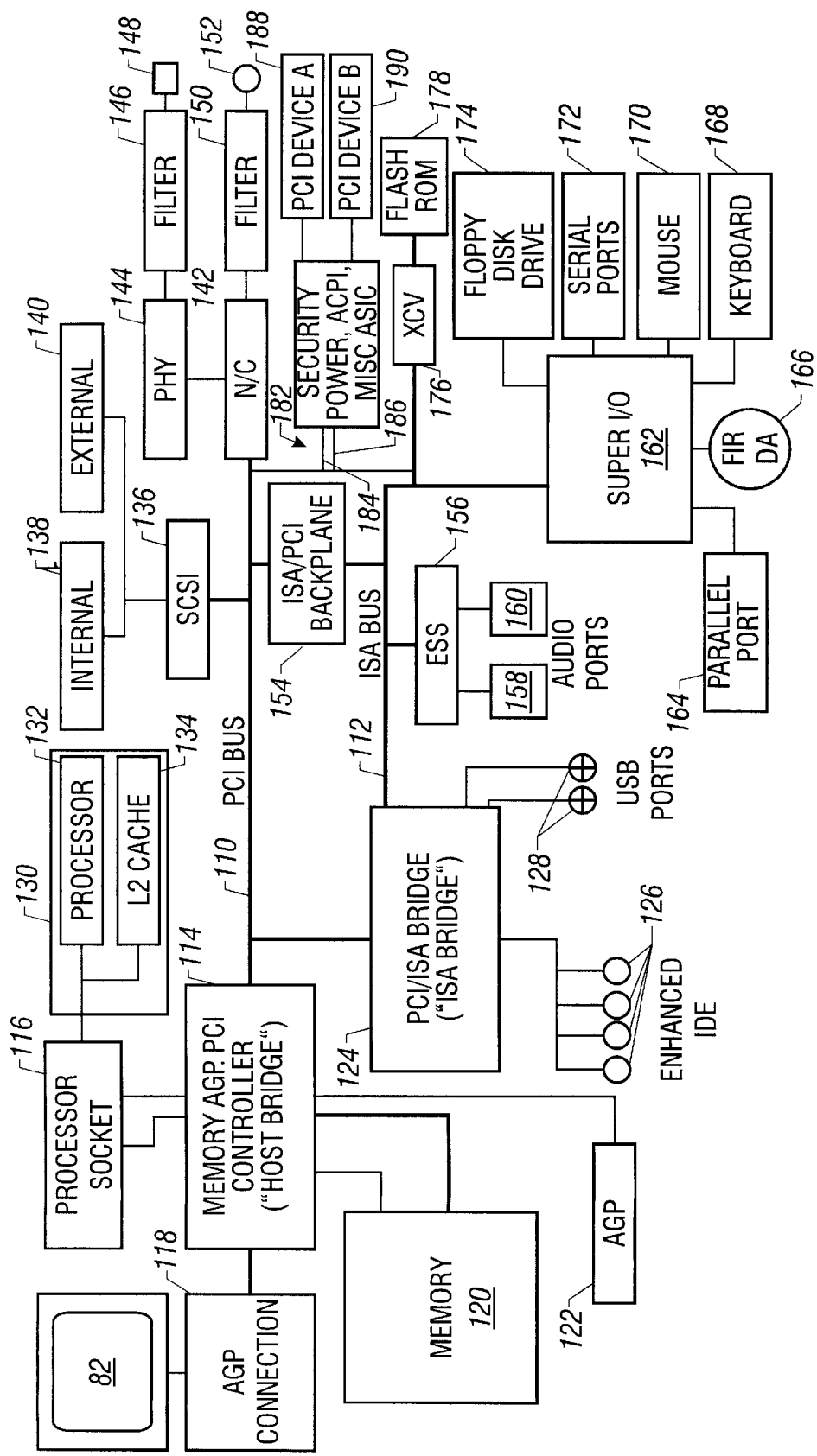
FIG. 2 is a schematic electrical circuit diagram of a computer system according to the present invention.

Turning to FIG. 2, a typical computer system S implemented according to the invention is shown. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 110 and an industry standard architecture (ISA) bus 112. The PCI bus 110 is controlled by PCI controller circuitry located within a memory/accelerated graphics port (AGP)/PCI controller 114. This controller 114 (the "host bridge") couples the PCI bus 110 to a processor socket 116 via a host bus, an AGP connector 118, a memory subsystem 120, and an AGP 122. A second bridge circuit, a PCI/ISA bridge 124 (the "ISA bridge") bridges between the PCI bus 110 and the ISA bus 112.

The host bridge 114 in the disclosed embodiment is a 440LX Integrated Circuit by Intel Corporation, also known as the PCI AGP Controller (PAC). The ISA bridge 124 is a PIIX4, also by Intel Corporation. The host bridge 114 and ISA bridge 124 provide capabilities other than bridging between the processor socket 116 and the PCI bus 110, and the PCI bus 110 and the ISA bus 112. Specifically, the disclosed host bridge 114 includes interface circuitry for the AGP connector 118, the memory subsystem 120, and the AGP 122. The ISA bridge 124 further includes an internal enhanced IDE controller for controlling up to four enhanced IDE drives 126, and a universal serial bus (USB) controller for controlling USB ports 128.

The host bridge 114 is preferably coupled to the processor socket 116, which is preferably designed to receive a Pentium II processor module 130, which in turn includes a microprocessor core 132 and a level two (L2) cache 134. The processor socket 116 could be replaced with different processors other than the Pentium H without detracting from the spirit of the invention.

The host bridge 114, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIE) presence detect, eight row address strobe (RAS) lines, error correcting code (ECC) with single and multiple bit error detection, read-around-write with host for PCI reads, and 3.3 volt DRAMs. The host bridge 114 support up to 66 megahertz DRAMs, whereas the processor socket 116 can support various integral and non-integral multiples of that speed.

The ISA bridge 124 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte couple metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 124 includes full clock control, device management, suspend and resume logic, advanced configuration and power interface (ACPI), and system management bus (SMBus) control, which implement the inter-integrated circuit (I2C) protocol.

The PCI bus 110 couples a variety of devices, usually master devices, that generally take advantage of a high speed data path. This includes a small computer system interface (SCSI) controller 136, with both an internal port 138 and an external port 140. In the disclosed embodiment, the SCSI controller 136 is a AIC-7860 SCSI controller. Also coupled to the PCI bus 110 is a network interface controller (NIC) 142, which preferably supports the ThunderLanTN power management specification by Texas Instruments. The NIC 142 is coupled through a physical layer 144 and a filter 146 to an RJ45 jack 148, and through a filter 150 to a AUI jack 152.

Between the PCI Bus 110 and the ISA Bus 112, an ISA/PCI backplane 154 is provided which include a number of PCI and ISA slots. This allows ISA cards or PCI cards to be installed into the system for added functionality.

Further coupled to the ISA Bus 112 is an enhanced sound system chip (ESS) 156, which provides sound management through an audio in port 158 and an audio out port 160. The ISA bus 112 also couples the ISA bridge 124 to a Super I/O chip 162, which in the disclosed embodiment is a National Semiconductor Corporation PC87307VUL device. This Super I/O chip 162 provides a variety of input/output functionality, including a parallel port 164, an infrared port 166, a keyboard controller for a keyboard 168, a mouse port for a mouse port 170, additional series ports 172, and a floppy disk drive controller for a floppy disk drive 174. These devices are coupled through connectors to the Super I/O 162.

The ISA bus 112 is also coupled through bus transceivers 176 to a flash ROM 178, which can include both basic input/output system (BIOS) code for execution by the processor 132, as well as an additional code for execution by microcontrollers in a ROM-sharing arrangement. The flash ROM 178 includes an ESCD sector for storing ESCD and associated variables. Details concerning ESCD may be obtained from the Extended System Configuration Data Specification, Version 1.02, published on Feb. 14, 1994 by Compaq Computer Corporation, Intel Corporation, and Phoenix Technologies, Ltd.

The PC host bridge 114 includes a PCI arbiter 175. It should be understood that a PCI arbiter may be integrated into a host/PCI bridge or a PCI/expansion bus bridge. When a PCI bus master requires use of the PCI bus 10, the PCI bus master requests use of the PCI bus 10 from the PCI arbiter 175. In a conventional PCI arbitration configuration, each PCI master is connected to the PCI arbiter 175 via a separate pair of REQ#/GNT# signals.

The PCI bus 110 according to the present invention couples the PCI bridge 114 to a general purpose application specific integrated circuit (or ASIC) 180 over a peripheral device signal pair 182. The signal pair 182 including a REQ# or request signal line 184 and a GNT# or grant signal line 186. The ASIC 180 contains a logic circuit L (FIG. 3) which connects a selected one of two PCI peripheral devices 188 and 190 to the request signal pair 182.

Figure 3:
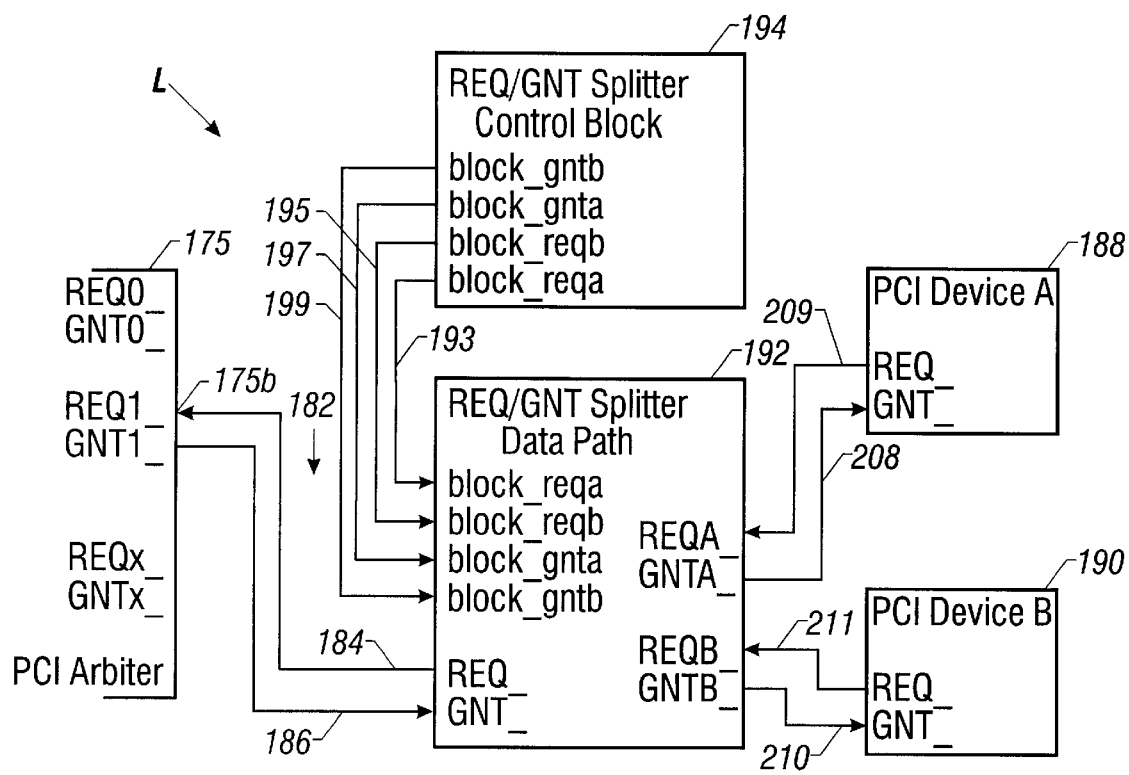
FIG. 3 is a schematic electrical circuit diagram of systems connection logic for peripheral devices of the computer system of FIG. 2.
Figure 4:
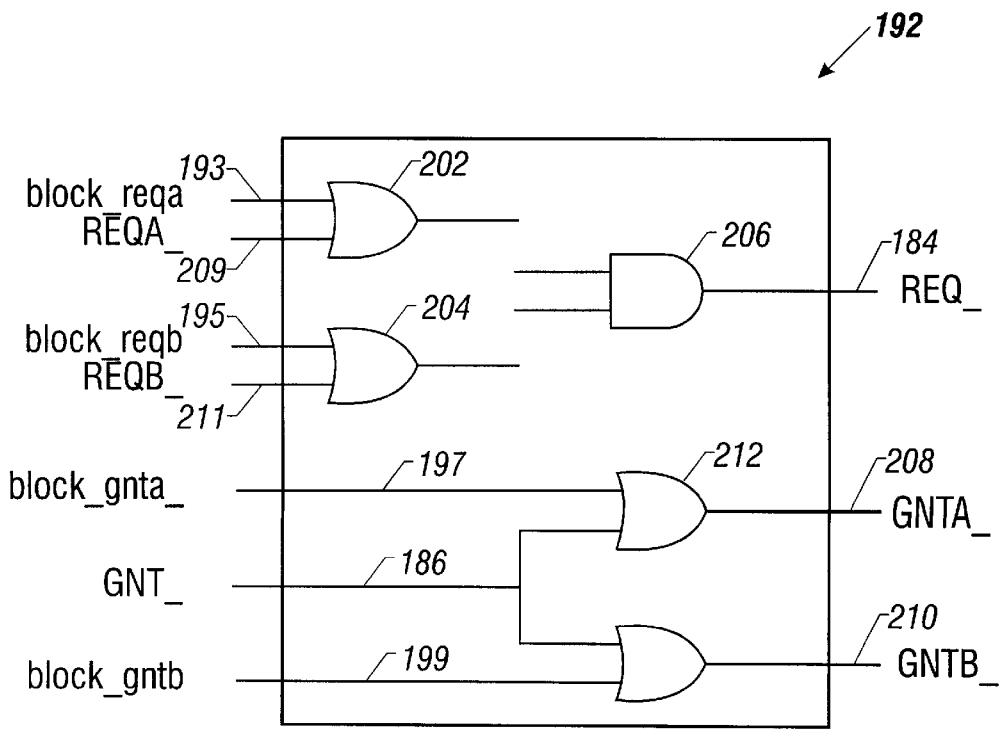
FIG. 4 is a schematic electrical circuit diagram of a data path in the system connection logic of FIG. 3.
Figure 5:
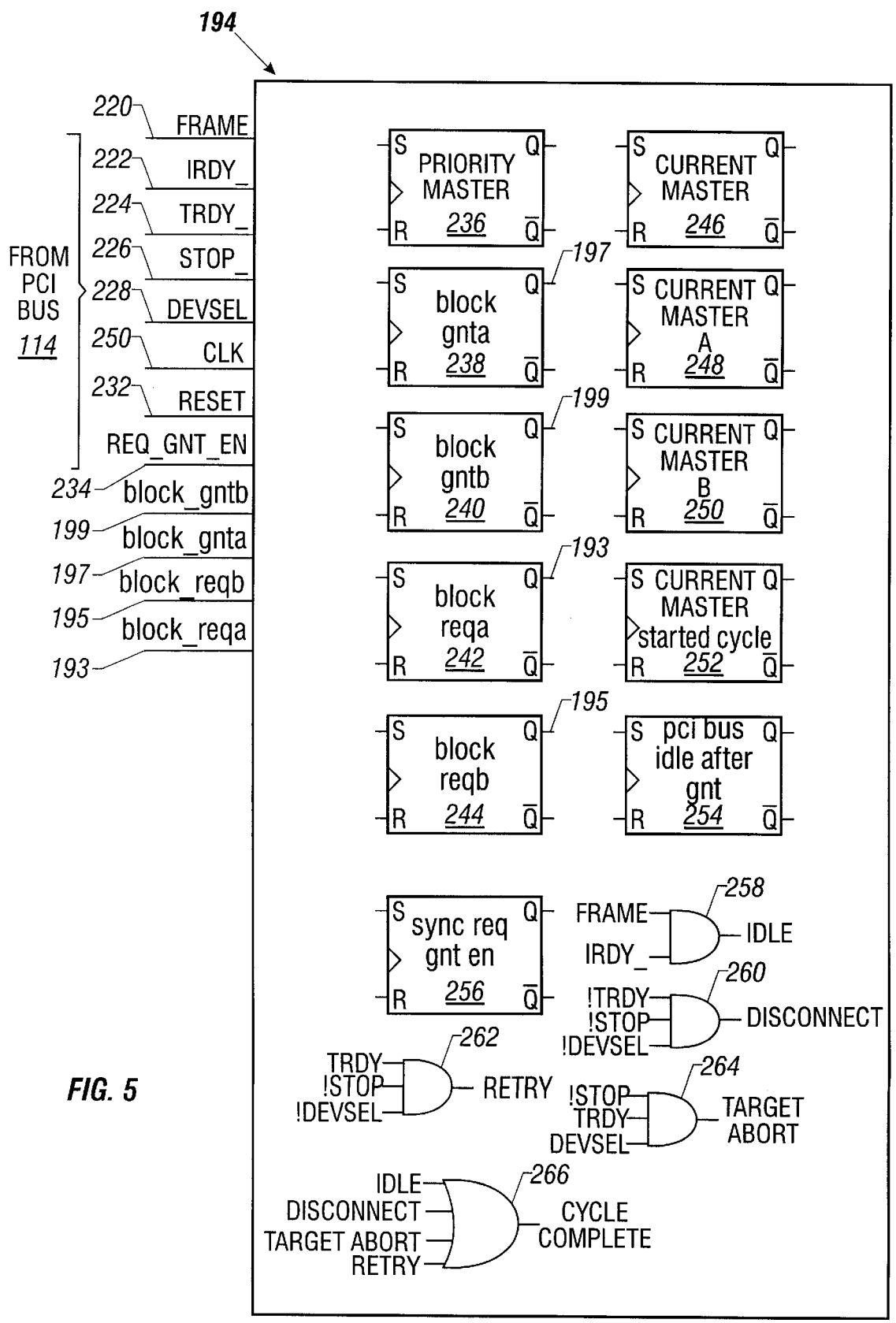
FIG. 5 is a schematic electrical circuit diagram of a control circuit of the system connection logic of FIG. 3.

The logic circuit L includes a splitter or data path 192 (FIG. 4) and a control circuit 194 (FIGS. 3 and 5). As will be set forth in detail below, the data path circuit 192 selectively connects one of the PCI peripheral devices 188 or 190 to the request signal pair 182 according to arbitration imposed by the control circuit 194.

In this manner, the PCI peripheral devices 188 and 190 may arbitrate for control of the PCI bus 110 via PCI bridge 114 without requiring a specific signal pair be assigned to each of them. This is further done while the devices 188 and 190 appear to system software of the computer system S to reside on the primary PCI bus 110.

As is conventional, the ASIC 180 also provides a variety of miscellaneous functions for the system. The ASIC 80, for example, includes conventional items such as security features, system power control, light emitting diode (LED) control, the PCI arbiter 175, remote wake up logic, system fan control, hood lock control, ACPI registers and support, system temperature control, and various glue logic. The PCI ISA bus 112 further couples the ISA bridge 124 to the security, power, ACPI, and miscellaneous application specific integrated circuit (ASIC) 180. Finally, a video display 82 can be coupled to the AGP connector 18 for display of data by the computer system S.

As has been noted, the logic circuit L in the computer system S allows two PCI master devices, such as 188 and 190, to share a single REQ#/GNT# signal pair 182 from the PCI bridge 114.

DATA PATH BLOCK

The data path circuit or splitter 192 of the logic circuit L receives a grant signal GNT_from grant signal line 186 connected at a selected GNT# terminal 175a of the peripheral device terminals of the PCI bridge 114. The splitter 192 forms a request signal REQ_in a manner set forth below which is furnished over the request signal line 184 to REQ# terminal 175b of the peripheral device terminals of the PCI bridge 114. The terminals 175 and 175 are from a single pair of PCI bridge peripheral device terminals, but may be any one of the several pairs available.

The splitter 192 also receives the following four signals:

block_reqa, over line 193 block_reqb, over line 195 block_gnta, over line 197 block_gntb, over line 199 which are formed in control circuit 194 in a manner to be set forth.

The splitter 192 forms the REQ_signal on request signal line 184 in accordance with the following digital logic equation:

$$REQ=(block\_reqb+REQB\_(block\_reqa+REQAJ\_),$$

with the REQB_signal being received in line 211 from master 190 and the REQA_signal being furnished over line 209 from master 188.

As shown in FIG. 3, the formation of the REQ_signal in the foregoing logic equation may be implemented by first and second OR gates 202 and 204 and an AND gate 206. It will be appreciated that a number of various implementations may be derived using different combinations of digital logic gates.

Similarly, the splitter 192 forms a GNTA_ signal which is furnished over a grant signal line 208 to a GNT_input terminal of PCI peripheral device 188 in accordance with the following logic statement:

GNTA_=block_gnta+GNTM_

In a corresponding manner, splitter 192 forms a GNTB_ signal which is furnished over a grant signal line 210 to a GNT_input terminal of PCI peripheral device 190 in accordance with the following logic statement:

GNTB_=block_gntb+GNT_

The GNT_grant signal for the foregoing logic statements is furnished from grant signal line 186, while the block_ gnta and block_gntb signals are formed in control circuit 194 in a manner to be set forth.

The formation of signals GNTA_and GNTB_in splitter 192 may be implemented by a pair of OR gates 212 and 214 as shown in FIG. 3. Again, it will be appreciated that a number of various logic implementations might also be devised with a variety of logic gates.

CONTROL BLOCK

The control circuit or block 194 (FIG. 5) of logic circuit L uses a state machine M (FIG. 6) to perform the local arbitration for single REQ#/GNT# signal pair 182 from the PCI bridge 114. The state machine M arbitrates between the attached PCI masters 188 and 190 (master A and master B) using the REQA_ and REQB_ inputs from such PCI masters. The control circuit 194 receives the following conventional PCI bus control signals from the PCI bus 114:

FRAME_, a signal on line 220 representing the PCI bus cycle frame signal;

IRDY_, a signal on line 222 representing the PCI bus initiator ready signal;

TRDY_, a signal on line 224 representing the PCI bus target ready signal;

STOP_, a signal on line 226 representing the stop signal when asserted on the PCI bus 114;

DEVSEL_, a signal on line 228 representing the PCI bus device select signal; and CLK, a signal on line 230, representing the PCI bus clock.

The control circuit 194 also receives the following signals, formed in a manner set forth below, as inputs:

RESET_, a signal on line 232 representing an asynchronous reset signal;

REQ_GNT_EN, a signal on line 234 representing an enable signal for

REQ_GNT sharing. If this signal is not asserted, control circuit 194 stays connected to PCI master 188.

The control circuit 194 contains a number of registers (FIG. 5) which receive inputs at their respective set and clear terminals. The registers shown in FIG. 5 and described below store and indicate present an operating state of control circuit 194 based on the assertion or deassertion of their input signals. It should be understood that registers other than S-R registers may also be used in control circuit 194.

The registers (FIG. 5) include a priority master register 236 which operates according to the conventional hardware description language (HDL) code, in particular Verilog, known to those in the art, set forth below:

```
begin
  if (!reset_)                          priority_master <= A;
  else if (SET_priority_master_A)       priority_master <= A;
    else if (SET_priority_master_B)     priority_master <= B;
end
```

SET_priority_master_A represents a set priority signal for master A, and SET_priority_master_B represents the set priority signal for master B. The priority_master variable represents the priority master register 236. The priority master register 236 is set to indicate priority for master 188 according to the following exemplary HDL code:

```
assign SET_priority_master_A = !sync_req_gnt_en  &&
                               (
                                 (cs = = IDLE)         &&
                                 (ns = = REQ)          &&
                                 SET_current_master_B
                               );
```

The cs variable represents the current state of the state machine S. The ns variable represents the next state machine S. The states of the state machine S, which include IDLE, REQ, RETRY1, RETRY2, and GNT, are discussed below. The SET_current_master_B variable represents a set current master B signal from register 250, as set forth below. The SYNC_req_gnt_en variable represents a request/grant enable signal for enabling and disabling requesting of the PCI bus_by a peripheral device.

The priority master register 236 is set to indicate priority for master 190 according to HDL code in the following exemplary manner:

```
assign SET_priority_master_B = sync_req_gnt_en  &&
                               (
                                 (cs = = IDLE)         &&
                                 (ns = = REQ)          &&
                                 SET_current_master_A
                               );
```

A block gnta register 238 of control circuit 194 forms the previously mentioned block_gnta signal over line 197 to splitter 192. Such a signal forces deassertion of the GNT_ signal for master 188. Register 238 operates according to the following exemplary HDL code statement:

```
begin
  if       (!reset)           block_gnta <= 1'b1;
  else if  (SET_block_gnta)   block_gnta <= 1'b1;
  else if  (CLR_block_gnta)   block_gnta <= 1'b0;
end
```

The block gnta register 238 is set at its set input terminal according to the following exemplary HDL code:

```
assign SET_block_gnta = sync_req_gnt_en &&
                        (
                          (cs = = IDLE) &&
                          (ns = = REQ) &&
```

```
                    SET_current_master_B
                         );
```

When so set, register 238 furnishes the block gnta signal over line 197 to splitter 192, as noted above.

The block gnta register 238 is cleared at its clear input terminal according to the exemplary HDL code statement:

```
assign CLR_block_gnta = !sync_req_gnt_en ||
                        (
                            block_gnta    &&
                            (ns = = REQ)        &&
                            (cs = = IDLE)       &&
                            SET_current_master_A);
```

A block gntb register 240 of control circuit 194 provides the previously mentioned block gntb signal over line 199 to splitter 192. This signal on line 199 forces deassertion of the GNT_signal for master B, master 190. Register 240 operates according to exemplary HDL code as follows:

```
assign SET_block_gntb = !sync_req_gnt_en
                        (
                            SET_block_reqb       ||
                            (ns = = IDLE)        ||
                            (ns = = RETRY1)      ||
                            (ns = = RETRY2)      ||
                            (
                                (current master = = B)   &&
                                (cs = = GNT)             &&
                                !reqa_                    &&
                                (
                                    current_master_started_cycle ||
                                    SET_current_master_started_cycle
                                )
                            )
                        )
                     );
```

The block_reqb signal in the code statement above is formed in a block_reqb register 244 to be described below.

Conversely, the block gntb register 240 is cleared at its clear input based on the following exemplary HDL code:

```
assign CLR_block_gntb = sync_req_gntn_en   &&
                        block_gntb          &&
                        (ns = = REQ)        &&
                        (cs = = IDLE)       &&
                        SET_current_master_B;
``` with the block_gntb signal being the output from register 240.

A block reqa register 242 of control circuit 194 forms the block_reqa signal for line 193 to force the deassertion of the REQ_signal for master 188 according to the following exemplary HDL code statement:

```
          begin
                if   (!reset_)
                block_reqa <= 1'b1;
                else if  (!CLR_block_reqa)
                block_reqa <= 1'b0;
```

```
                else if  (SET_block_reqa)
                block_reqa <= 1'b1;
          end
```

The CLR_block_reqa and SET_block_reqa signals are input signals furnished in the following manner. Register 242 is set at its set input terminal according to exemplary HDL code as follows:

```
assign SET_block_reqa = !block_reqa &&
                        sync_req_gnt_en   &&
                        (
                            (
                                (cs = = IDLE)       &&
                                (ns = = REQ)        &&
                                !(!reqa_ && (priority_master = = A ||
reqb_))
                            ) ||
                            (
                                (ns = = RETRY1) ||
                                (ns = = RETRY @)
                            )
                        );
```

The register 242 is cleared at its clear input terminal according to HDL code in the following exemplary manner:

```
assign CLR_block_reqa = !sync_req_gnt_en ||
                        (
                            block_reqa &&
                            (ns = = IDLE)
                        );
```

A block reqb register 244 of control circuit 194 form the block reqb to signal for line 195 to force deassertion of the REQ_ for master 190 based on exemplary HDL code as follows:

```
begin
     if   (!reset )                     block_reqb <= 1'b1;
     else if (CLR_block_reqb)           block_reqb <= 1'b0;
     else if (SET_block_reqb)           block_reqb <= 1'b1;
end
```

The CLR_block_reqb and SET_block_reqb signals mentioned above are formed in the following manner. The register 244 is set at its set input terminal according to the following exemplary HDL code:

```
assign SET_block_reqb =  !sync_req_gnt_en ||
                         (
                             !block_reqb &&
                             (cs = = IDLE)       &&
                             (ns = = REQ)        &&
                             !(!reqb_&& (priority_master = = B |
| reqa_))
                             ) ||
                             (
                                 (ns = = RETRY1)   ||
                                 (ns = = RETRY2)
                             )
                         );
```

Similarly, register 244 is cleared at its clear input terminal according to the exemplary HDL code as follows:

```
assign CLR_block_reqb = sync_req_gnt_en   &&
                        block_reqb &&
                        (ns = = IDLE);
```

A current master register 246 of control circuit 194 indicates whether master 188 or 190 is on the PCI bus. As noted above, if the REQ_GNT_EN signal on line 234 is not asserted, the master 188 is connected. Register 246 operates according to the exemplary HDL code as follows:

```
begin
    if  (!reset_)                       current_master <= A;
    else if (SET_current_master_A)      current_master <= A;
    else if (SET_current_master_B)      current_master <= B;
end
```

As can be seen, register 246 is set according to the state of a CURRENT MASTER A register 248 and a CURRENT MASTER B register 250. Register 248 is set at its set input terminal according to the following exemplary HDL code:

```
assign SET_current_master_A =  !sync_req_gnt_en    ||
                               (
                               (cs = = IDLE)          &&
                               !reqa_                 &&
                               (priority_master = = A || reqb_)
                               );
```

Current Master B register 250 is set at its set input terminal by the exemplary HDL code as follows:

```
assign SET_current_master_B =  sync_req_gnt en      &&
                               (cs   = = IDLE)      &&
                               (ns  = = REQ)        &&
                               !reqb_               &&
                               (priority_master = = B|| reqa_);
```

A current master started cycle register 252 of control circuit 194 operates to form a current_master_started_cycle signal according to the following exemplary HDL code statement:

```
begin
    if (!reset_)
        current_master_started_cycle <= 1'b0;
    else if (CLR_current_master_started_cycle)
        current_master_started_cycle <= 1'b0;
    else if (SET_current_master_started_cycle)
        current_master_started_cycle <= 1'b1;
end
```

The register 252 is set at its set input terminal according to the following exemplary HDL code statement:

```
assign SET_current_master_started_cycle =
                !current_master_started_cycle     &&
                pci_bus_idle_after_gnt            &&
                !frame_;
``` and is cleared at its clear input terminal as follows:

```
assign CLR_current_master_started_cycle =
                current_master_started_cycle &&
                (ns = = IDLE);
```

The pci_bus_idle_after_gnt signal identified in the code for register 252 is the output of a PCI bus idle after gnt register 254 of control circuit 194. The PCI bus ide after gnt register 254 operates according to the exemplary HDL code as follows:

```
begin
    if (!reset_)
        pci_bus_idle_after_gnt <= 1'b0;
    else if (CLR_pci_bus_idle_after_gnt)
        pci_bus_idle_after_gnt <= 1'b0;
    else if (SET_pci_bus_idle_after_gnt)
        pci_bus_idle_after_gnt <= 1'b1;
end
```

Register 254 is set at its gnt input terminal and cleared at its clear input terminal based on the following exemplary HDL code:

```
assign SET_pci_bus_idle_after_gnt =  !pci_bus_idle_after_gnt &&
                                     pci_bus_idle
                                     ((cs = = GNT) || (ns = = GNT));
assign CLR_pci_bus_idle_after_gnt =  pci_bus_idle_after_gnt&&
                                     (ns = = IDLE);
``` when the pci_bus_idle signal mentioned in the foregoing code is formed in a manner set forth below. A sync req gnt en register 256 of control circuit 194 operates according to the following exemplary HDL code statement:

```
begin
    if  (!reset_)
        sync_req_gnt_en <= 1'b0;
    else
```

-continued

```
        sync_req_gnt_en <= req_gnt_en;
    end
```

As can be seen, the various registers 236 through 256 store and indicate present operating states in the state machine M based on their respective input signals. The changes in operating states of the registers are based on the presence or absence, at their respective set and clear input terminals, of the signals specified in the codes above.

Certain signals are also formed by conventional gating circuitry in control circuit 194 based on the present state of the PCI bus control signals, for use by registers 236 through 256 described above. The signals and their conditions of being formed are as follows:

A PCI bus idle signal formed in a gate 258 is defined as both FRAME# and IRDY# deasserted, or in HDL code:

```
    assign pci_bus_idle=frame_ && irdy_;
```

A PCI bus "disconnect" signal formed in a gate 260 is defined as TRDY asserted, STOP asserted, and DEVSEL asserted. This differs from a retry in that a target that signals a disconnect will allow one final piece of data to transfer, while a target signaling a retry will not allow any data transfer. Stated in HDL code:

```
    assign pci_disconnect = !trdy_ && !stop_ && !devsel_;
```

A PCI bus "retry" signal formed in gate 262 is defined as TRDY deasserted, STOP asserted, and DEVSEL asserted. This differs from a disconnect in that a retry does not allow any data transfer to take place, while a disconnect allows one final data transfer to occur. In HDL code, this is defined as:

```
    assign pci_retry=trdy_ && !stop_ && !devsel_;
```

A PCI target abort signal formed in gate 264 is defined as STOP asserted, TRDY and DEVSEL deasserted, in HDL code as:

```
    assign pci_target_abort=!stop_ && trdy_ && devsel_;
```

Finally, a PCI cycle termination formed in gate 266 is defined in the following HDL code:

```
    assign pci_cycle_complete = pci_bus_idle   ||
                                pci_disconnect ||
                                pci_retry      ||
                                pci_target_abort;
```

Figure 6:
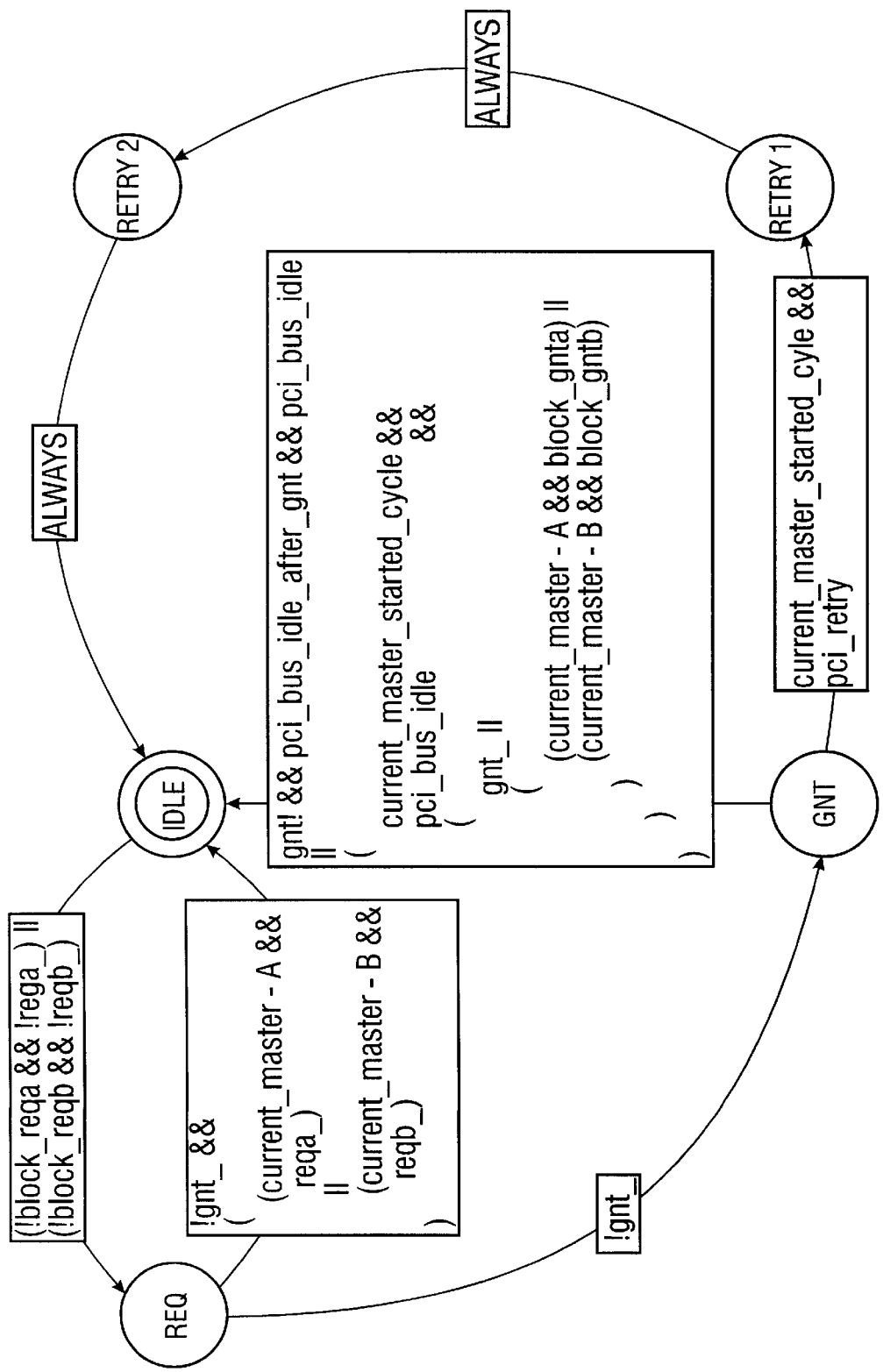
FIG. 6 is a state diagram depicting the operation of the control circuit of the system connection logic of FIGS. 3 and 5.

The foregoing signals are furnished as status signals to the PCI arbiter 175 to indicate the status of operations by state machine M to connect or disconnect either master A 188 or master B 190 to the PLI bus 114. The state machine M operates as illustrated in FIG. 6.

State machine M starts out in an IDLE state and proceeds to a REQ state in the event that the splitter 192 receives a REQ_ signal from either master 188 or 190. Once in the REQ state and once the GNT_signal on line 186 is deasserted, the state machine M proceeds to a GNT state. However, if the master either 188 or 190, being requested is already connected to the PCI bus 114, the state machine M returns to its idle state. The current_master signal from register 246 then indicates that a master is already connected to the PCI bus 114. If such is the case when the GNT_signal is asserted on line 186, the state machine M returns to its idle state, as noted. In the GNT state, the state machine M proceeds back to the idle state, if: control of the PCI bus 114 has already been granted to a master, a master has already started its PCI cycle, and the PCI bus 114 is idle. The GNT state may be defined according to the following exemplary HDL code:

```
    gnt! && pci_bus_idle_after_gnt && pci_bus_idle)
    ||
    (
        current_master_started_cycle &&
        pci_bus_idle                              &&
        (
            gnt_  ||
            (
                (current_master = = A && block_gnta)   ||
                (current_master = = B && block_gntb)   ||
            )
        )
    )
```

Otherwise, the state machine remains in the GNT state unless a master has already started its PCI cycle and the PCI retry signal is asserted. In this event, two retries are attempted in states RETRY 1 and RETRY 2 before reverting to the IDLE state.

Normally, if the PCI bus 10 is idle on the next clock cycle after GNT_, the requesting master 188 or 190 is granted access to the PCI bus 10 and state machine M reverts to the idle state.

The foregoing disclosure and description of the invention are illustrative and explanatory thereof, and various changes in the number of variables, number of parameters, order of steps, field sizes, data types, code elements, code size, connections, components, and materials, as well as in the details of the illustrated hardware and software and construction and method of operation may be made without departing from the spirit of the invention.

What is claimed is:

1. A computer system, comprising:

a processor;

a main memory for said processor;

a bus;

a plurality of peripheral devices;

an arbiter for permitting access of said peripheral devices to said bus;

a bridge selectively connecting said bus to said processor main memory;

a signal pair for connecting a peripheral device to said bridge; and a logic circuit for connecting a selected one of said peripheral devices to said signal pair.

2. The computer system of claim 1, wherein said bus is a peripheral component interconnect bus.

3. The computer system of claim 1, wherein said bridge is a peripheral component interconnect bridge.

4. The computer system of claim 1, wherein said peripheral device is a master device.

5. The computer system of claim 1, wherein said peripheral device is a SCSI host adapter.

6. The computer system of claim 1, wherein said peripheral device is a LAN host adapter.

7. The computer system of claim 1, wherein said peripheral device is an I/0 device.

8. The computer system of claim 1, wherein said peripheral device is a graphic adapter.

9. The computer system of claim 1, wherein said peripheral device is a second bridge.

10. The computer system of claim 1, wherein said signal pair comprises:

a request signal line for transferring a request for access from one of said peripheral devices to said arbiter; and a grant signal line for transferring a grant of access from said arbiter to one of said peripheral devices.

11. The computer system of claim 10, wherein said logic circuit includes:

a data path circuit for selectively connecting a selected one of said plurality peripheral devices to said request signal line and said grant signal line.

12. The computer system of claim 11, wherein said logic circuit includes:

a control circuit for controlling the selection of a peripheral device by said data path circuit.

13. The computer system of claim 12, wherein said control circuit comprises a state machine for performing arbitration among the peripheral devices for connection to said data path circuit.

14. A computer system, comprising:

a processor;

a main memory for said processor;

a bus;

a plurality of peripheral devices;

a bridge selectively connecting said bus to said processor main memory;

a signal pair for connecting a peripheral device to said bridge;

a logic circuit for connecting a selected one of said peripheral devices to said signal pair;

a set of signal pairs fewer in number than said plurality of peripheral devices for connecting peripheral devices to said bridge; and a logic circuit for controlling access by said peripheral devices to aid set of signal pairs for connection of said peripheral devices to said bridge.

15. The computer system of claim 14, wherein said logic circuit includes:

a data path circuit for selectively connecting a selected one a plurality of said peripheral devices to said request signal line and said grant signal line.

16. The computer system of claim 14, wherein said logic circuit includes:

a control circuit for controlling the selection of a peripheral device by said data path circuit.

17. The computer system of claim 16, wherein said control circuit comprises a state machine for performing arbitration among the peripheral devices for connection to said data path circuit.

18. A method of allowing access by peripheral devices of a peripheral component interconnect bus to a bridge for access to a processor main memory in a computer system, comprising the steps of:

receiving a request from a peripheral device for access to the bridge;

determining whether a signal pair adapted to connect the peripheral device to the bridge is available; and if the signal pair is available, granting access for the peripheral device to the signal pair.

19. The method of claim 18, further including the step of:

repeating said step of determining if the signal pair is unavailable.

20. A computer system, comprising:

a processor;

a main memory for said processor;

a bus;

a plurality of peripheral devices grouped in pairs;

an arbiter for permitting access of said peripheral devices to said bus;

a bridge selectively connecting said bus to said processor main memory;

a plurality of signal pairs, each for connecting a selectively connectable one of said pairs of peripheral devices to said bridge; and a plurality of logic circuits, each logic circuit for connected to one of said plurality of signal pairs and selectively connecting one of said pairs of peripheral devices to said plurality of signal pairs.

21. The computer system of claim 20, wherein each of said logic circuits includes:

a data path circuit for selectively connecting a selected one a plurality of said peripheral devices to said request signal line and said grant signal line.

22. The computer system of claim 20, wherein each of said logic circuits includes:

a control circuit for controlling the selection of a peripheral device by said data path circuit.

23. The computer system of claim 20, wherein each of said logic circuits includes:

said control circuit comprises a state machine for performing arbitration among the peripheral devices for connection to said data path circuit.

24. A logic circuit for a computer system to connect a selected one of a plurality of peripheral devices to a signal pair for access to a bridge of the computer system, comprising:

a data path circuit for selectively connecting a selected one a plurality of said peripheral devices to said request signal line and said grant signal line; and a control circuit for controlling the selection of a peripheral device by said data path circuit.

25. The logic circuit of claim 24, wherein said control circuit comprises a state machine for performing arbitration among the peripheral devices for connection to said data path circuit.

* * * * *